W. E. CARSON.
PROCESS OF SLAKING LIME.
APPLICATION FILED SEPT. 28, 1915.
1,244,421.
Patented Oct. 23, 1917.
2 SHEETS—SHEET 1.
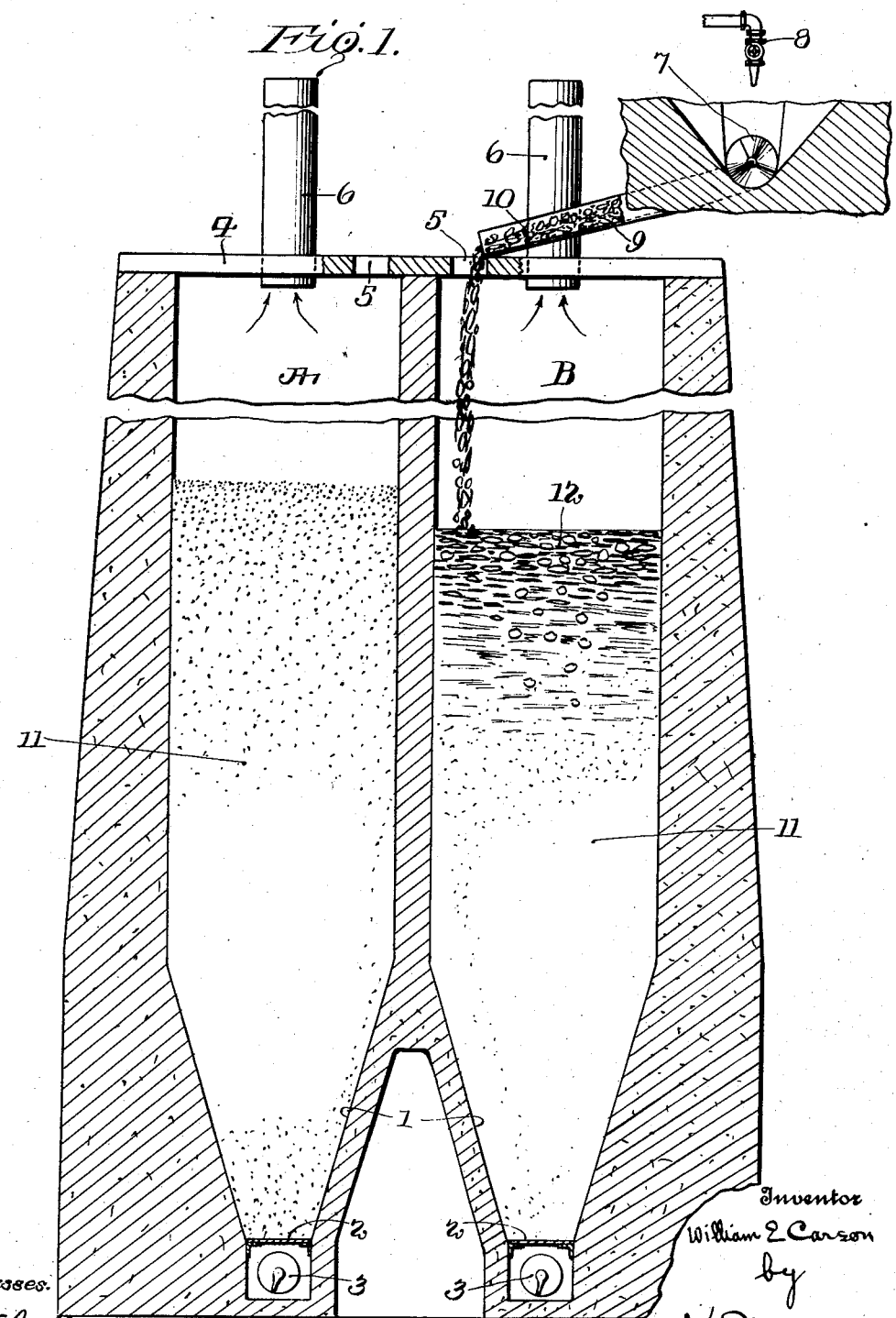

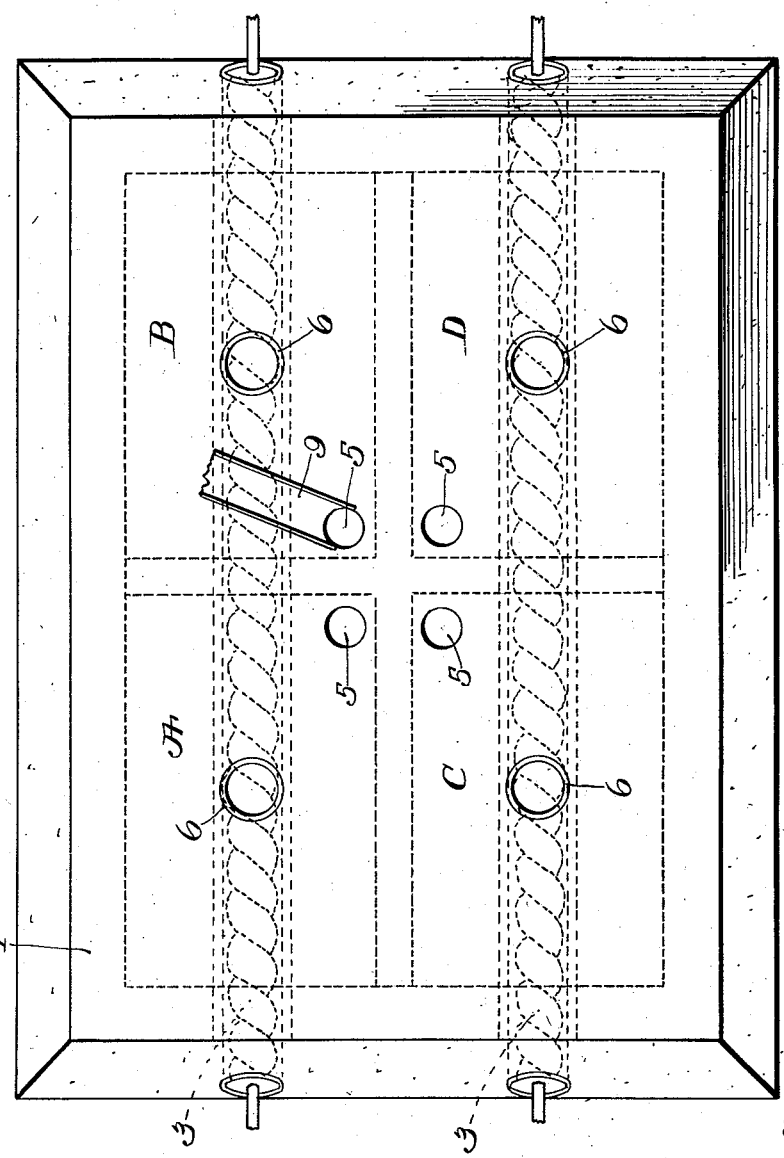

UNITED STATES PATENT OFFICE.

WILLIAM E. CARSON, OF RIVERTON, VIRGINIA.

PROCESS OF SLAKING LIME.

1,244,421.  Specification of Letters Patent.  Patented Oct. 23, 1917.

Application filed September 28, 1915. Serial No. 53,049.

*To all whom it may concern:*

Be it known that I, WILLIAM E. CARSON, a citizen of the United States, residing at Riverton, in the county of Warren and State of Virginia, have invented certain new and useful Improvements in Processes of Slaking Lime, of which the following is a specification.

This invention relates to processes of slaking lime; and it comprises a method of slaking lime to produce pulverulent, dry, dustless, slaked lime of a high degree of plasticity wherein quicklime is rapidly mixed with sufficient water to convert it into a thick milk, slurry or cream of lime and the mixture so formed is deposited in a closed chamber as a quiescent mass to allow slaking of such mass to progress to an end in an atmosphere of self-generated vapor, a time of at least 8 hours and advantageously from 2 to 3 or more days being allowed for such slaking of said quiescent mass and the proportion of water to lime being so correlated with thermal and other conditions in such chamber as to cause the production of a dry, dustless powder of hydrated lime, the product on the addition of further amounts of water being adapted to form therewith a soft, "fat," putty-like or buttery mass having what may be termed colloid characteristics; and it more particularly comprises such a process wherein quicklime, which may be in lump form, but is advantageously fine ground, is agitated with enough water to convert it into a slurry or cream, this proportion usually ranging between 50 pounds and 120 pounds of water for each 100 pounds of lime for a high calcium lime, and 40 to 90 pounds for a high magnesia lime; the slurry so produced without affording it time to heat or slake to a substantial degree is quickly deposited in a vertical chamber in such manner that each successive addition of such slurry shall form a sort of upper sealing layer for previously prepared material below, and the material is allowed to season in the chamber for from 8 hours to 4 days until it becomes converted into a dry and dustless powder of hydrated lime; all as more fully hereinafter set forth and as claimed.

As is well known, a good article of building or plastering lime on slaking with considerable water under the usual conditions in the mortar box will give a soft, buttery or putty-like mass of a lime hydrate having pronouncedly colloid characteristics. This hydrate being colloid-like spreads well under the trowel and is easily handled and manipulated. Some limes, and particularly those known as the "fat" limes, give a hydrate having these characteristics in an extreme degree, while the "lean" limes do not give this result in so great a degree. All limes suitable for building and plaster purposes however, possess the characteristic in a greater or less degree.

As however, the slaking in the mortar box requires considerable time and manual labor, it has lately become the custom to slake lime with a limited amount of water and place the product upon the market in the shape of a dry powder. This powder upon addition of a further amount of water is adapted to form a mortar with sand, etc. Unfortunately, these ready slaked limes, it is found in practice, do not give the desirable buttery or putty-like hydrate with water that would have been yielded by the original lime if slaked in the ordinary manner. The plastic hydrate produced from these dry hydrated limes tends to "roll" under the trowel and is more or less "short." The commercial dry hydrated limes do not give as desirable mortar or plaster as the lime slaked by hand in the usual methods.

I have discovered that this difference in characteristics is in large part due to the fact that the dry ready slaked limes are slaked without sufficient attention to temperature and other conditions, such as the amount of water used, the intimacy of incorporation, the time of incorporation and of slaking, the physical condition of the lime, etc.

When water is added to quicklime, and thoroughly incorporated therewith, there is generally a pause which may be a fraction of a minute with a rich, fat lime and may last considerably longer with a leaner or magnesium lime. At the end of this period hydration begins and there is the well known development of a high temperature, heat being continuously evolved until the completion of the slaking. The actual temperature attained by the slaking mass depends upon very many conditions. Upon this temperature however depends much of the quality of the finished lime; slaking at too high a temperature giving a less valuable product.

As to the reason for the differences in behavior of limes slaked at different temperatures I am unable to say, contenting myself with noting the fact without attempting a positive explanation. It is my impression, however, that in burnt lime the molecules of CaO are more or less "associated"; that is are present in high-molecular complexes, and that upon slaking with considerable water under comparatively cool conditions, this association persists and hydrates are obtained which, being high-molecular in their nature, have colloid properties more or less. On the other hand it may be that by allowing the temperature to rise too high these associated molecules break down into simpler groups. A hydrate of lime containing many associated molecules should be more colloid in its characteristics than a hydrate containing fewer associated molecules. And it is my belief that the high temperature which usually obtains (at least locally) in these ordinary dry-slaking operations breaks down the combination of the molecules. It is a common statement among mortar mixers that "steam carries away the fatness", and this I think is not due to the presence of steam particularly, but to the high temperature which it indicates.

Control of temperature during slaking operation is intimately connected with the amount of water used. If very much water is used, the heat developed in the hydration of the lime is taken up in heating the water or in evaporating it. If too little water be used in the slaking operation the lime is apt to overheat during the slaking and it is difficult to produce uniform slaking. As stated, overheated lime is not as plastic as that slaked at a lower temperature. If the temperature be kept down during the slaking operation in order to avoid this loss of plasticity, uniform hydration is hard to obtain. On the other hand if much water be used while overheating does not occur and uniform slaking is easy to obtain, yet the product is wet or damp and it is very difficult to produce a good "free running" dry hydrated lime from this material. Subsequent drying is of course expensive.

In the present invention I have provided a simple, cheap and ready method of producing high grade dustless, dry, powdered, hydrated lime of uniform hydration and of uniform character whatever the peculiarities of the quicklime from which it is made. Limes high in calcium oxid (CaO) and those high in magnesia (MgO) are equally well and uniformly hydrated. This uniform hydration of the bases present is one of the great advantages of my process. In such process I first rapidly treat the lime with more than enough water for the complete hydration, and secure an intimate and complete incorporation prior to occurrence of any substantial degree of hydration. In the case of a pure high calcium lime about 33 per cent. of water is necessary for complete hydration. In the present invention I use considerably more water. With a lime comparatively high in calcium oxid (CaO), and not containing over, say, 5 per cent. magnesia (MgO), I usually employ from 50 to 120 pounds of water for every 100 pounds of lime. With lime somewhat higher in magnesia I may employ a little less water, say 40 to 90 pounds, since the heating and evaporation are not so great. The amount of water stated is enough to convert lime into a pasty condition for a short interval of time before hydration sets in; say between a thick milk of lime and a slurry.

I have found that an intimately incorporated lime slurry with this proportion of water if promptly removed from the mixing device and deposited in a substantially closed chamber in a body of substantial depth and size and allowed to remain quiescent for a sufficient length of time will slake very effectively and perfectly without overheating and become converted into a body of the desired type of dry slaked lime. With this amount of water in the present operation the excess above that necessary for chemical combination with the lime is converted into vapor and a large quantity of this vapor remains in contact with the lime; the lime completes its slaking in an atmosphere of more or less saturated steam. With the proportions given this steam or vapor is not at a high temperature; it will not ordinarily reach much over 100° C.; say not above 104° or 105° C. and it may be only 100° C. or a fraction of a degree above. The steam formed is usually saturated steam. At this range of temperatures, during slaking overheating does not occur and the lime retains its plasticity. With the stated amount of water however the excess is completely converted into vapor by the heat developed during the slaking under the conditions described and there is left a loose dry powder which, for some reason, unlike most slaked lime preparations, is dustless. Possibly this dustless character is correlated with the plasticity the product displays on subsequent mixing with water. Free escape of vapor from the chamber should be provided as it is not desired to have any great vapor pressure prevail therein; but it is desired that enough vapor shall remain in the chamber to the end of the operation to insure that slaking takes place in an atmosphere of steam of around 100° C.

In the hydration of lime there is a large quantity of heat generated. In all other processes of hydration an effort is made to absorb a substantial proportion of the heat so generated by means of convection, radiation or conduction in addition to that heat any of the heat generated by hydration.

In performing my process, I am able to resort to the use of much larger quantities of water than in any other known process of producing dry hydrate without subsequent drying. By the use of this excess water, substantially all of the heat generated by hydration is absorbed in raising the temperature of the mass of lime and the large quantity of water to the boiling point of water and then further through the latent heat of evaporation of the excess water present without further raising the temperature. By absorbing the heat generated in this way, the necessity of heat elimination through convection, radiation and conduction is reduced to a minimum.

I have found that in my process it is advantageous to have the slaking or "seasoning" take place under what may be termed "solid pressure"; that it is desirable to form the slaking mass quickly into a relatively tall column so that the natural expansion in slaking is resisted by the weight of the column and confined by the side walls of the slaking chamber. For this reason it is advantageous to perform the slaking operation in a relatively tall narrow chamber having strong side walls and build up the column of material by rapid additions. As the lime slakes this forces expansion upward against the weight of material as well as against the friction of the side walls.

The best mode of applying my discovery or invention which I have devised is to take the quicklime and grind it to a fine powder or small granules. The powder or particles may be advantageously fine enough to pass an eighth-inch screen. Lump lime is less easy to handle and is not so advantageous. This powdered or granulated lime I mix quickly with the desired amount of water in such a manner as to obtain a good and intimate mixture with formation of a cream or slurry prior to the occurrence of any great amount of hydration or the development of a high heat. This cream or slurry I feed into a relatively tall vertical chamber at a rapid rate; 15 tons or more per hour in the case of a rectangular chamber, say, 10 by 15 feet and 30 feet high. As a general rule deposition should be at a rate of at least an inch in vertical height per minute and it may be advantageously much more rapid. As the cream falls on the bottom of the chamber it remains in its plastic form for some little time and then gradually changes to a layer of the described pulverulent dustless material; succeeding layers weighing down on, be given at least 12 hours however. As each successive layer of lime cream is delivered into the chamber it forms what may be termed a sealing layer above that previously deposited, holding the vapors within it more or less. Feeding of the lime slurry to the chamber is continued until the desired amount of lime has been deposited therein; in the case of the 30-foot chamber just mentioned, this amount being 50 to 70 tons. During the operation the column of lime in this chamber is gradually changing in character from below upward; the last layer applied, or the top layer, being always a freely flowing semi-liquid cream or slurry. Beneath this layer, and sealed in thereby, is a dry pulverulent body of lime which has been hydrated or is in the act of hydrating. This hydrating lime below the liquid or fluent layer gives off more or less vapor and the excess passes upward through the slurry layer and to the exit. The object is not to produce any great amount of pressure of steam in the column of lime but to have the individual lime particles bathed in an atmosphere of steam of around 100° C.; saturated steam. There should be enough steam and vapor, and enough is provided in this operation, to restrain the development of a high heat during the slaking; of a heat high enough to affect the plasticity disadvantageously. But it is also desired that there shall be no more water and steam in the material undergoing slaking than will be sufficient to furnish the moisture necessary for hydration and heat control and leave a dry powder. After the desired amount of seasoning in the chamber is effected, which, as stated, ordinarily requires two or three days, the lime is drawn from the chamber. Such water vapor as then remains in it diffuses off into the air. The product is free of dust and is a fine, uniform powder of as high plasticity as can be made from the particular lime under treatment. This high plasticity is true even in the case of limes high in magnesia. With such limes the hydrated magnesia may indeed give the material, in use on hydrating to make mortar, a peculiar buttery consistence. On cooling the lime so hydrated does not become wet or clumpy. The lime so withdrawn may be treated in any of the usual manners practised in handling and preparing commercial hydrated lime.

In the accompanying drawing I have shown, more or less diagrammatically, an embodiment of apparatus elements within the present invention and susceptible of use in the performance of the stated process.

In this showing, Figure 1 is a vertical section, certain parts being shown in elevation, of a 4-bin structure taken along lines x—x of Fig. 2; and Fig. 2 is a top plan view of this apparatus.

As shown (see Fig. 2) the apparatus consists of four reaction chambers A. B. C and D. As more particularly shown in Fig. 1, these reaction chambers are built of concrete, steel, masonry or any other suitable structural material. They are of greater heigth than breadth and are provided with tapering bottom portion 1 continued down to a false bottom 2 of iron plates or the like. Below this false bottom is a conveyer screw 3. At the tops these reaction chambers are provided with a common top 4 which serves as a floor for a working chamber. Through this top are pierced several inlets 5. Passing through the top of each reaction chamber is a ventilating chimney 6. Mounted above the working floor or roof of the reaction chambers is a pugmill or the like 7 into which water may be discharged from 8. At the end of the pugmill trough is an adjustable chute 9 which may be brought into operative relationship to any of the charging apertures (5).

In the use of the described structure, lump, granulated or powdered lime is charged into the pugmill 7 and is wetted with water at 8. Enough water is used to convert the lime into a slurry or rather pasty fluent condition. The grinding or agitation in the pugmill should be at a sufficiently rapid rate to secure good and intimate incorporation prior to development of a substantial degree of slaking or heating. The pasty mass of lime and water 10 passes down through the chute into the reaction chambers. As shown in Fig. 1 reaction chamber A is full of material which has been left to react and season while B is in charging phase. As shown, B contains a loose mass 11 of powdered slaked lime surmounted by a layer 12 of fluent or slurry-like mass. Through this pasty or semi-liquid layer steam from the reacting mass below passes freely. Reaction in the mass goes on progressively and as shown the top layer is, in a measure a sealing layer confining the steam and heat below; but not confining them too much.

After the material has seasoned in the reaction chambers for the necessary period of time the plates (2) at the ends may be removed and the loose powdered hydrated lime allowed to fall into the path of screw conveyer 3 which removes lime for sacking, barreling or other disposal.

In the described operation it will be noted that the temperature regulation is, so to speak, automatic. An excess of water is used, though not more than the heat will subsequently expel, and this water insures that the temperature shall not rise much above 100° C. The lime is treated with the water while in a dry absorbent condition and every particle is in molecular contact with the water. A preliminary fine grinding, or at least a granulation, very much assists the rapid absorption of water; the thorough wetting, interiorly as well as exteriorly, of every particle of the lime. The intimate incorporation of water and lime is secured and prior to any substantial hydration, since heating and steaming very much interfere with entrance of moisture into the pores and, thereby, with the desired intimate incorporation. Rapid work in the pugmill is therefore desirable. The incorporation being secured, the slaking mass is allowed to lie quiescent, bathed in its own steam or vapor; but, under the conditions, this steam does not become superheated. In every mass of lime there are portions which hydrate more quickly than other portions; but in the present operation this is immaterial since the slow slaking particles are given time to hydrate in the presence of water or of saturated steam.

This quiescent condition of the mass during the perfection of slaking is a very important element in my process. Any degree of agitation of the mass during the operation militates against the quality of the subsequent product; and to make the best product the mass should not be stirred or otherwise agitated during what may be termed the "seasoning" operation; that is, for at least 10 and preferably many more hours.

For absorption of heat and maintenance of a moderate temperature, evaporation of the water is relied upon; no dependence being placed upon removal of heat by convection or by radiation as in most of the processes heretofore proposed.

In this mode of operation since there is always a blanket or cover of slurry-like lime above the mass, there is no loss of lime by carrying away with the steam as in many prior operations. Where steam is allowed an unrestricted exit from a mass of slaking lime and particularly if this lime be at a high temperature, dust-like particles go forward, not only giving a loss of lime but creating more or less of a nuisance.

What I claim is:—

1. A process of slaking lime to produce a dry, dustless, hydrated lime which comprises admixing lime with sufficient water to make a slurry in a suitable mixing device, removing it from said device and depositing the slurry so formed as a stationary quiescent mass in a chamber to slake in the presence of its own steam, such mass being allowed to remain quiescent in said chamber for at least 8 hours, and the amount of water added in forming the slurry being sufficient to furnish said steam and to complete the hydration of said lime to a dry dustless powder but insufficient to give a moist product.

2. A process of slaking lime to produce a dry, dustless, hydrated lime which comprises mixing quicklime in a suitable mixing device with an amount of water ranging between 40 and 120 pounds for each 100 pounds of lime and thereby forming a slurry, removing the slurry from said device and depositing the slurry so formed as a stationary mass in a substantially closed chamber to slake in the presence of its own steam, said mass being allowed to remain quiescent in said chamber for at least 8 hours prior to removal therefrom.

3. A process of slaking lime to produce a dry, dustless, hydrated lime which comprises mixing quicklime in a suitable mixing device with sufficient water to form a fluent slurry, removing the slurry from said device and depositing such slurry as successive layers in a substantially closed vertical chamber whereby each successively added upper layer acts as a sealing layer for the layers therebelow, causing the latter to slake in an atmosphere of their own steam, the mass formed by such successive layers being allowed to remain quiescent in said vertical chamber for at least 8 hours before discharging the same.

4. A process of slaking lime to produce a dry, dustless, hydrated lime which comprises mixing quicklime in a suitable mixing device with sufficient water to form a fluent slurry, removing the slurry from said device and depositing such slurry as successive layers in a substantially closed vertical chamber at a rate not less rapid than one vertical inch per minute whereby each successively added upper layer acts as a sealing layer, for the layers therebelow causing the latter to slake in an atmosphere of their own steam, the mass formed by such successive layers being allowed to remain quiescent in said vertical chamber for at least 8 hours before discharging the same.

5. A process of slaking lime to produce a dry, dustless, hydrated lime which comprises comminuting quicklime, rapidly and thoroughly commingling the comminuted quicklime in a suitable mixing device with more than enough water to slake and in such manner as to form a slurry, removing the slurry from said device, depositing the slurry in substantially closed vertical successive layers and allowing the assembled layers to remain quiescent and slake and season in their own vapor till a fine powder minuting such magnesian lime, rapidly and thoroughly commingling the comminuted lime with more than enough water to slake and in such manner as to form a slurry, depositing the slurry in vertically successive layers and allowing the assembled layers to remain quiescent and slake and season in their own vapor till a fine powder of hydrated lime forms, the period of quiescence during which such assembled layers are allowed to remain prior to disturbance of the same being at least 8 hours.

7. A process of slaking magnesian limes to produce dry, dustless, hydrated products of high plasticity which comprises comminuting such magnesian lime, rapidly and thoroughly commingling the comminuted lime in a suitable mixing device with more than enough water to slake and in such manner as to form a slurry, removing the slurry from said device, depositing the slurry in vertically successive layers in a substantially closed chamber, allowing the assembled layers to remain quiescent for a period of 2 days or more to slake and season in their own vapor until a fine powder of hydrated lime forms and then removing such fine powder.

8. A process of slaking lime to produce a dry, dustless, hydrated lime which comprises admixing lime with sufficient water to make a slurry in a suitable mixing device, removing it from said device, and depositing the slurry so formed as a stationary quiescent mass in a chamber to slake in the presence of its own steam, such mass being allowed to remain quiescent in said chamber for at least 8 hours and the amount of water added in forming the slurry being sufficient to furnish said steam and to complete the hydration of said lime to a dry dustless powder but insufficient to give a moist product.

9. A process of slaking lime to produce a dry, dustless, hydrated lime which comprises mixing quicklime in a suitable mixing device with an amount of water ranging between 40 and 120 pounds for each 100 pounds of lime and thereby forming a slurry, removing the slurry from said device and depositing the slurry so formed as a stationary mass in a chamber to slake in the presence of its own steam, said mass being allowed to remain quiescent in said chamber for at least 8 hours prior to removal therefrom.

10. A process of slaking lime to produce a dry, dustless, hydrated lime which comprises mixing quicklime in a suitable mixing device with sufficient water to form a fluent layers being allowed to remain quiescent in said vertical chamber for at least 8 hours before discharging the same.

11. In the direct manufacture of dry hydrated lime the process which consists in quickly mixing comminuted lime with sufficient water to form a slurry therewith, the amount of such water being no more than will suffice to hydrate such lime and furnish a limited amount of water vapor under the heat of reaction without being in such excess as to leave a damp or moist final product, and the speed of mixing being such as to allow formation of such slurry prior to the occurrence of any substantial degree of hydration, quickly forming a tall vertical column of such slurry in a strong walled receptacle, the speed of formation of the column being such as to insure a liquid seal by such slurry for its top, and allowing the mixture to undergo reaction in a quiescent state under its own pressure resisted by the walls of such receptacle for a period of at least 8 hours, and finally withdrawing dry hydrated lime as a commercially finished product.

12. The process of making a dry hydrate of lime which comprises quickly mixing quicklime with only sufficient water to furnish that necessary for hydration and loss through evaporation and to make initially a slurry with such lime, quickly depositing such slurry to make a column of such mixture of such a height as to maintain the majority of the mass under pressure of the upper part of the column, the upper part acting as a sealing layer to prevent excess escape of moisture, allowing such column of material to remain undisturbed for a period of at least 8 hours while seasoning takes place, and removing the lime as a dry powder.

In testimony whereof, I affix my signature.

WILLIAM E. CARSON.